United States Patent
Karaoguz

(10) Patent No.: US 8,249,647 B2
(45) Date of Patent: Aug. 21, 2012

(54) MOBILE COMMUNICATION DEVICE HAVING MULTIPLE INDEPENDENT OPTIMIZED PHYSICAL LAYERS

(75) Inventor: Jeyhan Karaoguz, Irvine, CA (US)

(73) Assignee: Broadcom Corporation

(*) Notice: Subject to any disclaimer, the term of this patent is extended or adjusted under 35 U.S.C. 154(b) by 1013 days.

(21) Appl. No.: 11/760,153

(22) Filed: Jun. 8, 2007

(65) Prior Publication Data

US 2008/0176595 A1 Jul. 24, 2008

Related U.S. Application Data

(60) Provisional application No. 60/886,048, filed on Jan. 22, 2007.

(51) Int. Cl.
*H04M 1/00* (2006.01)

(52) U.S. Cl. ............... 455/552.1; 370/469; 455/430

(58) Field of Classification Search ............... 343/702, 343/700, 906, 901; 455/552, 403, 552.1, 455/522, 426.2; 333/193; 370/334, 389; 713/300

See application file for complete search history.

(56) References Cited

U.S. PATENT DOCUMENTS

| | | | |
|---|---|---|---|
| 7,212,837 B1* | 5/2007 | Calhoun et al. | 455/560 |
| 7,450,523 B1* | 11/2008 | Robertson et al. | 370/252 |
| 7,787,447 B1* | 8/2010 | Egan et al. | 370/389 |
| 2003/0114182 A1* | 6/2003 | Chan et al. | 455/525 |
| 2003/0231715 A1* | 12/2003 | Shoemake et al. | 375/267 |
| 2004/0095907 A1* | 5/2004 | Agee et al. | 370/334 |
| 2004/0203815 A1* | 10/2004 | Shoemake et al. | 455/450 |
| 2004/0264475 A1* | 12/2004 | Kowalski | 370/395.5 |
| 2005/0058114 A1* | 3/2005 | Santhoff et al. | 370/343 |
| 2005/0091693 A1* | 4/2005 | Amine et al. | 725/100 |
| 2005/0135318 A1* | 6/2005 | Walton et al. | 370/338 |
| 2005/0147071 A1* | 7/2005 | Karaoguz et al. | 370/338 |
| 2005/0147075 A1* | 7/2005 | Terry | 370/338 |
| 2005/0147122 A1* | 7/2005 | Florimond Van Acker et al. | 370/468 |
| 2005/0259686 A1* | 11/2005 | Lewis | 370/469 |
| 2006/0007871 A1* | 1/2006 | Welin | 370/252 |
| 2006/0013327 A1* | 1/2006 | Sugar et al. | 375/260 |
| 2006/0034165 A1* | 2/2006 | Levy | 370/208 |
| 2006/0268777 A1* | 11/2006 | Schmidt | 370/329 |
| 2007/0047669 A1* | 3/2007 | Mak et al. | 375/316 |
| 2007/0105587 A1* | 5/2007 | Lu | 455/552.1 |
| 2007/0111757 A1* | 5/2007 | Cao et al. | 455/561 |
| 2007/0153731 A1* | 7/2007 | Fine | 370/329 |
| 2007/0211675 A1* | 9/2007 | Jain et al. | 370/338 |
| 2008/0080440 A1* | 4/2008 | Yarvis et al. | 370/338 |
| 2009/0219990 A1* | 9/2009 | Han et al. | 375/240.02 |

* cited by examiner

*Primary Examiner* — Nick Corsaro
*Assistant Examiner* — Mahendra Patel
(74) *Attorney, Agent, or Firm* — Brinks Hofer Gilson & Lione

(57) ABSTRACT

A system and method in a mobile communication device for providing and/or utilizing multiple independent optimized physical layers to provide communication services. As a non-limiting example, a mobile communication device may comprising a first PHY layer comprising first circuitry operable to provide any of at least a first plurality of communication services through one or more types of communication network, and a second PHY layer comprising second circuitry operable, independent of the first PHY layer, to provide at least one communication service through one or more types of communication network. For example, operation of the first circuitry may be optimizable in a first manner for providing a first communication service of the first plurality of communication services and optimizable in a second manner, different from the first manner, for providing a second communication service of the first plurality of communication services.

27 Claims, 5 Drawing Sheets

MOBILE COMMUNICATION DEVICE HAVING MULTIPLE INDEPENDENT OPTIMIZED PHYSICAL LAYERS

CROSS-REFERENCE TO RELATED APPLICATIONS/INCORPORATION BY REFERENCE

This patent application is related to and claims priority from provisional patent application Ser. No. 60/886,048 filed Jan. 22, 2007, and titled "MOBILE COMMUNICATION DEVICE HAVING MULTIPLE INDEPENDENT OPTIMIZED PHYSICAL LAYERS," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A mobile communication device may be adapted to communicate over a plurality of communication networks. A mobile communication device may be adapted to provide a plurality of different services through any or all of the plurality of communication networks. For example, a user of a mobile communication device may utilize the communication device to provide a first communication service or a second communication service through a particular communication network.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a mobile communication device for providing and/or utilizing multiple independent optimized physical layers to provide communication services to the user, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION

Figure 1:
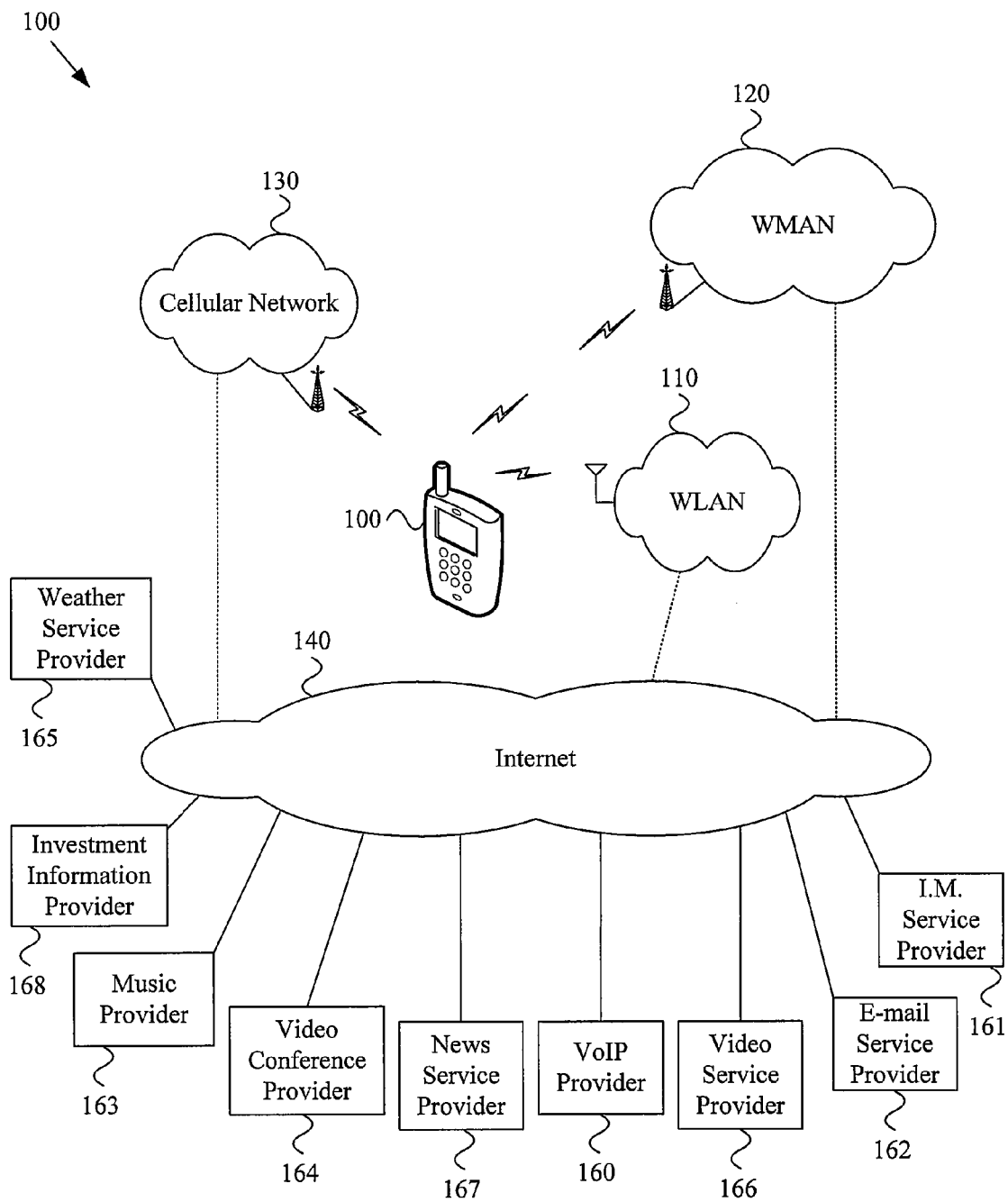
FIG. 1 is a block diagram illustrating an exemplary communication environment for a mobile communication device.

The following discussion will refer to various communication modules, components or circuits. Such modules, components or circuits may generally comprise hardware, software or a combination thereof. Accordingly, the scope of various aspects of the present invention should not be limited to particular hardware and/or software implementations of a module, component or circuit.

The following discussion will also refer to communication networks. For the following discussion, a communication network is generally the communication infrastructure through which a mobile communication device may communicate. For example and without limitation, a communication network may comprise a cellular communication network, a wireless metropolitan area network (WMAN), a wireless local area network (WLAN), a wireless personal area network (WPAN), etc. A particular communication network may, for example, generally have a corresponding communication protocol according to which a communication device may communicate with the communication network. Unless so claimed, the scope of various aspects of the present invention should not be limited to characteristics of a particular type of communication network.

The following discussion will additionally refer to communication services. For the following discussion, a communication service generally corresponds to the nature of the information being communicated to and from a communication device through a communication network. For example and without limitation, a communication service may correspond to a voice communication service, a music communication service, a multi-media communication service, a video communication service, an email communication service, a data communication service, a world-wide-web browsing communication service, an instant messaging communication service, etc. Unless so claimed, the scope of various aspects of the present invention should not be limited to characteristics of a particular type of communication service.

The following discussion will further refer to applications. Such applications may, for example, comprise software or firmware instructions that, when executed by a processor, perform various functions corresponding to communication services. In various examples, a particular dedicated application may correspond to a particular communication service (e.g., a music playing application or a VoIP application). In various other examples, a particular application may correspond to a plurality of communication services (e.g., a multi-media application capable of providing audio and/or video communication services), which may, for example, be selected by a user.

As non-limiting examples, a user may utilize a mobile communication device to provide a two-way voice communication service through a cellular network (e.g., cellular telephony), a WLAN (e.g., voice over IP or VoIP), a WMAN, etc. Also for example, a user may utilize a mobile communication device to provide a music communication service to the user (e.g., through audio data streaming) through a cellular network, a WLAN, a WMAN, a WPAN, etc. Further for example, a user may utilize a mobile communication device to provide a two-way multi-media communication service to the user through a cellular network, a WLAN, a WMAN, a WPAN, etc. Also for example, a user may utilize a mobile communication device to provide a video communication service to the user (e.g., through video data streaming) through a cellular network, a WLAN, a WMAN, a WPAN, etc.

FIG. 1 is a block diagram illustrating an exemplary communication environment 100 for a mobile communication device. FIG. 1 illustrates that a user may utilize a mobile communication device 105 to provide various communication services through various communication networks.

The mobile communication device 105 ("MCD"), though illustrated with the form-factor of a cellular telephone, may comprise characteristics of any of a variety of mobile communication devices. For example and without limitation, the mobile communication device 105 may comprise characteristics of a cellular telephone, portable music player, portable video player, personal digital assistant, mobile email device, mobile web browsing device, handheld computer with communication capability, portable navigation system, mobile Internet gaming device, etc.

The mobile communication device 105 is illustrated in FIG. 1 with multiple (e.g., three) concurrent links to multiple respective communication networks. For example, the mobile communication device 105 may be communicating with a Cellular Network 130 via an RF link, a WMAN 120 via an RF link, and a WLAN 110 via an RF link. Such links may, for example, be maintained utilizing a plurality of independent PHY layers in the MCD 105. As will be discussed in more detail later, such independent PHY layers may be optimized for providing a particular communication service or for providing a particular communication service over a particular communication network (e.g., a particular type of communication service over a particular type of communication network).

The mobile communication device 105, though illustrated utilizing RF links to the WLAN 110, WMAN 120 and Cellular Network 130, may utilize communication links through any of a variety of communication media. For example and without limitation, the mobile communication device 105 may communicate utilizing wireless RF, non-tethered optical, tethered optical or wired links.

Each of the illustrated networks (e.g., the WLAN 110, WMAN 120 and Cellular Network 130) may be communicatively coupled to various other networks. In the non-limiting exemplary scenario, illustrated in FIG. 1, each of the illustrated networks 110-130 is communicatively coupled to the Internet 140. For example, in a non-limiting exemplary scenario where a user is utilizing the mobile communication device 105 to provide streamed multi-media information to the user, the mobile communication device 105 may utilize any of the illustrated networks 110-130 and the Internet 140 to request and receive such streamed multi-media information from a provider of such information that is communicatively coupled to the Internet 140.

FIG. 1 illustrates a non-exclusive set of various communication service providers. For example and without limitation, a VoIP service provider 160, instant message service provider 161, email service provider 162, music service provider 163, video conferencing service provider 164, weather service provider 165, movie service provider 166, news service provider 167 and investment information provider 168 are illustrated communicatively coupled to the Internet 140. Note that various communication service providers are not necessarily communicatively coupled to the Internet 140 and may be communicatively coupled only to other networks. For example, a music providing service (or any other communication service) may be communicatively coupled directly to the Cellular Network 130, WMAN 120 or WLAN 110 for more direct service.

FIG. 1 shows a block diagram illustrating an exemplary communication environment 100 for a mobile communication device 105. Various portion of FIG. 1 may be referred to directly or by inference in the following discussion. Note that the exemplary communication environment 100 is merely an illustrative tool. Thus, various features of the exemplary communication environment 100 should not be utilized to limit the scope of various aspects of the present invention unless explicitly claimed.

Figure 2:
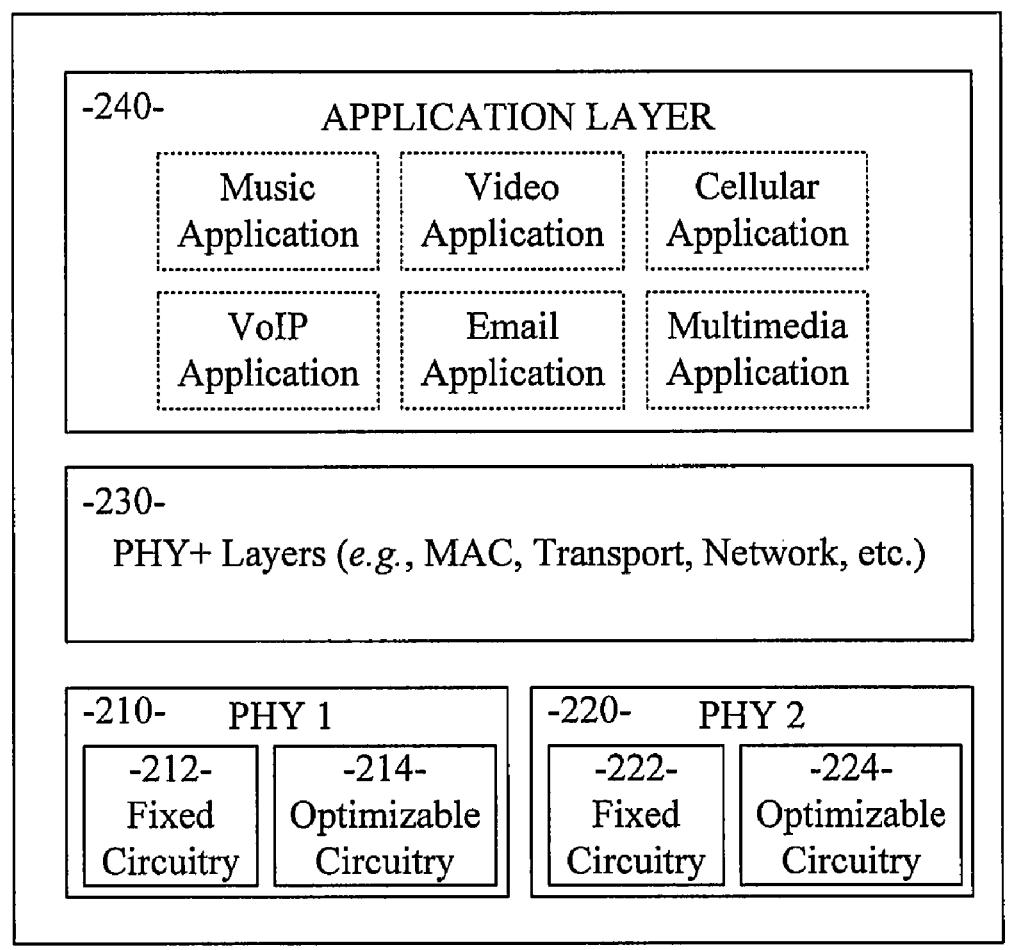
FIG. 2 is a block diagram illustrating various communication layers in an exemplary mobile communication device, including one or more independent optimizable physical layers, in accordance with various aspects of the present invention.

FIG. 2 is a block diagram illustrating various communication layers in an exemplary mobile communication device 200, including one or more independent optimizable physical layers, in accordance with various aspects of the present invention. The mobile communication device 200 may, for example and without limitation, share any or all characteristics with the mobile communication device 105 illustrated in FIG. 1 and discussed previously.

The exemplary mobile communication device ("MCD") 200 may comprise a first PHY layer 210, a second PHY layer 220, PHY+Layers 230 and an Application Layer 240. The first PHY Layer 210 may comprise Fixed Circuitry 212 and Optimizable Circuitry 214. The second PHY Layer 220 may comprise Fixed Circuitry 222 and Optimizable Circuitry 224. The various protocol layers 210, 220, 230 and 240, and components thereof, are merely exemplary. For example, many alternative protocol stack arrangements and/or implementations thereof are within the scope of various aspects of the invention.

As mentioned above, the first PHY layer 210 may be implemented utilizing various combinations of Fixed Circuitry 212 and Optimizable Circuitry 214. The Fixed Circuitry 212 generally comprises PHY layer circuitry, the performance characteristics of which do not change between different communication services. As a non-limiting example, a particular implementation of a PHY layer may comprise a particular low-noise amplifier ("LNA") or band-pass filter ("BPF") that correspond to communication with a particular type of communication network (e.g., a network based on IEEE 802.11, 802.16 or 802.22). Such exemplary LNA or BPF might operate the same for any communication service provided through the particular type of communication network. For example and without limitation, such exemplary LNA or BPF might operate the same whether the mobile communication device 200 is providing a two-way voice communication service, a music providing service, a streaming video service, a text message service, an email service, a web-browsing service, a first VoIP service type, a second VoIP service type or any other communication service through the particular type of communication network.

Note that the previously mentioned LNA and BPF were merely illustrative examples. The exemplary scenario discussed above does not exclude LNA and BPF circuitry from being optimizable, versus fixed, when designed to be so. Whether a particular circuit/module is optimizable or fixed depends on particular circuit architecture. For example, in a first exemplary PHY layer, a buffer might be fixed, and in a second exemplary PHY layer, the same buffer or an analogous buffer might be optimizable.

The Optimizable Circuitry 214 generally comprises PHY layer circuitry, the performance characteristics of which may be optimized in accordance with a particular communication service or type of particular communication service. The following discussion will present a non-exclusive set of examples of such Optimizable Circuitry. Note that the scope of various aspects of the present invention should not be limited to particular circuits unless claimed as such.

Figure 3:
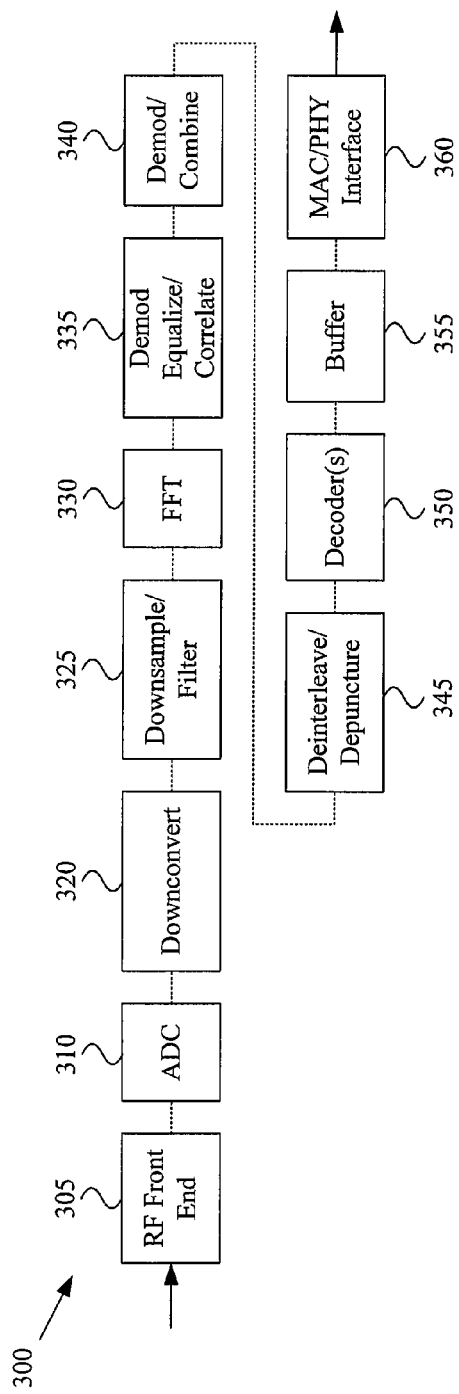
FIG. 3 is a block diagram illustrating exemplary physical layer receiving circuitry, in accordance with various aspects of the present invention.
Figure 4:
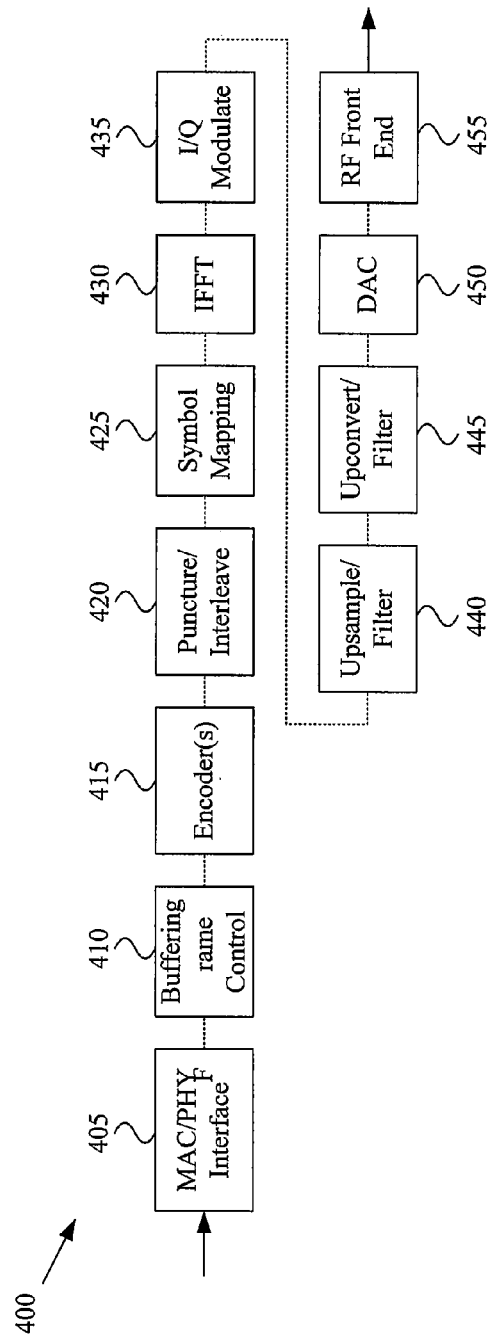
FIG. 4 is a block diagram illustrating exemplary physical layer transmitting circuitry, in accordance with various aspects of the present invention.

FIGS. 3 and 4 present non-exclusive examples of various PHY layer circuits or modules, which may be included in the first PHY layer 210 and/or the second PHY layer 220. FIG. 3 is a block diagram illustrating exemplary physical layer receiving circuitry 300, in accordance with various aspects of the present invention. FIG. 4 is a block diagram illustrating exemplary physical layer transmitting circuitry 400, in accordance with various aspects of the present invention. Note that the exemplary receiving circuitry 300 and transmitting circuitry 400 is non-exclusive, and various aspects of the present invention should not be limited to such particular exemplary circuitry unless claimed as such.

The exemplary physical layer receiving circuitry 300 may comprise an RF front end 305 (e.g., including an antenna, RF switch bank, band-pass filter, low-noise amplifier, MIMO processing block, OFDM receiving block, etc.). The exemplary PHY layer receiving circuitry 300 may also comprise an analog-to-digital converter 310, downconverter 320, downsampler/filter 325, FFT engine 330, demodulator/equalizer/correlator 335, demodulator/combiner 340, deinterleaver/depuncturer 345, one or more decoders 350 (e.g., a convolutional turbo decoder and/or Viterbi decoder), a buffer 355 (e.g., a channel buffer, H-ARQ memory/buffer, etc.), and a MAC/PHY interface 360. The exemplary PHY layer transmitting circuitry 400 may comprise a MAC/PHY interface 405, buffering and frame control circuit 410, one or more encoders 415 (e.g., convolutional encoders), a puncturer/interleaver 420, a symbol mapper 425, IFFT engine 430, I/Q modulator 435, upsampler/filter 440, upconverter/filter 445, digital-to-analog converter 450 and RF front end 455 (e.g., including MIMO processing circuitry or OFDM transmitting blocks, power amplifier, RF switch bank, etc.).

Various PHY layer circuits (e.g., of the previously-listed PHY layer circuits) may be optimizable for providing a particular communication service. The following examples represent a non-exclusive set of examples of such Optimizable Circuitry. For example, a PHY layer buffer circuit may be optimizable in length (or size) (e.g., where particular communication services operate optimally with different respective buffer lengths). For example, different communication services may have different respective latency or Quality-of-Service ("QoS") requirements or power management profiles, resulting in different respective optimal PHY layer buffer lengths/size.

Also for example, PHY layer encoders and decoders may be optimizable in type or length/size (e.g., where particular communication services operate optimally with different types or rates of encoders and decoders). For example, a particular decoder (e.g., a Viterbi decoder) may operate at different rates, depending on the particular communication service being provided by the MCD 200.

Additionally for example, a PHY layer FFT or IFFT engine may be optimizable in size and/or accuracy (e.g., where particular communication services have different rate and/or error-susceptibility requirements) For example, rate and/or error-rate requirements may depend on the particular type of data being communicated with a particular communication service (e.g., voice data requirements versus email data requirements). Similarly, ADC and DAC converter circuitry may be configured to operate with different degrees of accuracy and/or resolution depending on the particular communication service being provided by the MCD 200 (e.g., a voice communication service and a music communication service might have different respective information fidelity requirements).

Also for example, a PHY layer synchronization circuit may be optimizable (e.g., in periodicity and/or accuracy), for example, where particular communication services have different synchronization requirements). For example, synchronization requirements may depend on the particular type of data being communicated with a particular communication service (e.g., voice data requirements versus video data requirements).

Further for example, PHY layer circuitry (e.g., buffers, signal detectors, envelope detectors, etc.) may be optimized for power-save operation associated with a particular communication service. For example, running fixed PHY layer circuitry at an operation level good enough for all communication services may result in wasted energy when the MCD 200 is providing a communication service that does not require such a high-level of performance. In such cases, the performance (e.g., in terms of accuracy and/or error rate) of an optimized PHY layer circuit may be reduced to conserve power while still providing the current communication service at a desired level of performance.

In general, any of the PHY circuits illustrated in FIGS. 3 and 4, and other non-illustrated traditionally fixed-operation PHY circuitry, may be optimized to provide a particular communication service. Note that particular aspects of PHY circuitry operation may be mandated by a particular communication protocol (or air-interface specification), but generally, communication protocols allow room for the aforementioned PHY layer communication-service-driven optimization. Accordingly, in particular communication service scenarios, for example when a particular communication service is being provided through a particular communication network, various optimization opportunities may be available or unavailable depending on the air interface specification associated with the particular communication network.

As discussed above, any of a variety of PHY layer circuits may be optimized for providing a particular communication service. Optimization of such circuitry is circuit-dependent and may be performed in a variety of manners. For example and without limitation, for optimization control, any of the above-mentioned optimizable PHY layer circuits may comprise a control interface, with which other circuitry (e.g., circuitry performing optimization control) may communicate to govern behavior of the particular PHY layer circuits. Also for example, any of the above-mentioned optimizable PHY layer circuits may comprise control registers, which may be written to by other circuitry. Additionally for example, any of the above-mentioned optimizable PHY layer circuits may comprise operating state control circuitry (e.g., state machine circuitry), the state of which may be affected by other circuitry.

Also, optimization flexibility features may be built into any of the previously mentioned Optimizable Circuitry. For example and without limitation, any of the previously mentioned Optimizable Circuitry (e.g., buffering, filtering, decoding and encoding circuitry) may be architected with a variable and controllable number of data cells. Such flexibility may, for example, be utilized to adjust buffer/filter length, data resolution, data processing accuracy, etc.

Also for example, any of the previously mentioned optimizable circuits may be architected with a plurality of selectable fixed circuit options (e.g., fixed circuits with particular lengths, speeds, resolutions, accuracies, etc.). Such fixed circuit options may then be selected by other circuitry (e.g., circuitry performing optimization control) in accordance with a particular communication service being provided by the MCD 200. For example, one or more of a plurality of fixed buffer circuits may be inserted or removed from a signal processing stream in accordance with desired optimized buffer length. Similarly, one or more of a plurality of fixed filter circuits may be inserted or removed from a signal processing stream in accordance with desired optimized filter behavior.

As mentioned previously, various optimizable PHY layer circuits may be configured and/or selected in accordance with a particular communication service being provided. Such optimization may be controlled entirely by PHY circuitry or may be controlled by higher layer circuitry. For example, such optimization may be controlled by the application layer (e.g., by a processor executing software or firmware instructions).

As discussed previously, an application may have a one-to-one correspondence with a particular communication service (e.g., music or VoIP) or a one-to-many correspondence with a plurality of communication services (e.g., multi-media options). Thus, an application may be configured to control various optimizable PHY circuit characteristics. For example, in a one-to-one scenario, during initiation of a particular application (e.g., a VoIP application) to provide a particular communication service to a user of the MCD 200, the application may comprise communication service initialization instructions that, when executed, cause various optimizations to occur in the optimizable PHY layer circuitry. Also for example, in a one-to-many scenario, particular application routines or sub-routines associated with a particular communication service may comprise instructions that, when executed, cause various optimizations to occur in the optimizable PHY layer circuitry. In such an example, a single communication service application may cause any of a plurality of PHY layer optimizations depending on which communication service the application is presently providing.

To enhance such application-based PHY layer optimization control, an application program interface ("API") may be utilized. For example, an API may provide various interfaces (e.g., commands or invocable subroutines) that an application may incorporate to effect PHY layer optimization control. Such API may include instructions that, when linked with and/or compiled into a particular application, effect various elements of PHY layer circuit optimization. For example, an executed API instruction may cause one or more PHY layer circuit optimization control signals to be generated, where such control signals may in turn cause operational changes in the PHY layer circuitry (e.g., control register changes, state changes, signal routing changes, etc.).

As discussed above, in addition to being optimized to a particular communication service being provided by the MCD 200, various PHY layer circuits may also be optimized in accordance with the particular communication network through which the communication service is being provided. That is, various PHY layer circuits may be optimizable as a function of the particular communication service/communication network combination.

As mentioned above, the first PHY layer 210 may be implemented utilizing various combinations of Fixed Circuitry 212 and Optimizable Circuitry 214. The second PHY layer 220 may also be implemented utilizing various combinations of Fixed Circuitry 222 and Optimizable Circuitry 224. Alternatively, the second PHY layer 220 may, for example, be implemented utilizing Fixed Circuitry exclusively.

Though the exemplary MCD 200 is illustrated with only a first PHY later 210 and a second independent PHY layer 220, the MCD 200 may also comprise three or more of such independent PHY layers.

As presented in FIG. 2, the first PHY layer 210 and the second PHY layer 220 are independent. However, such independence is generally functionally (or operationally) independent rather than structurally independent. The first PHY layer 210 and the second PHY layer 220 may be completely architecturally independent, but alternatively may also share various circuitry while maintaining functional independence. Note that such functional independence provides for simultaneous (or concurrent) utilization of both of the first PHY layer 210 and the second PHY layer 220.

For example, the first PHY layer 210 and the second PHY layer 220 may share one or more circuits. Such shared circuits may, for example, be time-shared between the first PHY layer 210 and second PHY layer 220 in a manner such that operation of the first PHY layer 210 does not substantially impact functionality of the second PHY layer 220 and vice-versa. As a non-limiting example, a decoder (e.g., a Viterbi decoder) may be time-shared between the first PHY layer 210 and the second PHY layer 220. As another non-limiting example, various antenna circuitry may be shared between the first PHY layer 210 and second PHY layer 220. As yet another non-limiting example, various MAC/PHY interface circuitry and/or an FFT engine may be shared between the first PHY layer 210 and the second PHY layer 220 while maintaining the operational independence of the first PHY layer 210 and the second PHY layer 220.

The mobile communication device 200 is illustrated in FIG. 2 with various PHY+ layers 230. The PHY+ layers 230 may generally comprise any of a variety of communication layers, depending on the particular communication stack(s) being implemented. For example, such layers may include TCP/IP layers, OSI layers, etc. (e.g., Data Link Layer, MAC layer, Transport Layer, Network Layer, etc.).

The previous discussion focused on various optimizable PHY layer circuits. It should be noted that, in addition to PHY layer Optimizable Circuitry, various PHY+ layer circuits may also be optimizable. For example, various PHY+ layer circuits may be optimized in conjunction with the PHY layer optimizable circuits. As non-limiting examples, CODEC circuitry may be optimizable and/or assignable to particular PHY layers, either in real-time or non-real-time (e.g., in accordance with the needs of a particular communication service, for example, particular audio or video service). Operational performance of CODEC circuitry may also be optimized in real-time in accordance with the needs of a particular communication service.

Also for example, power-saving features may be optimized in PHY+ layers as well as at the PHY layer. For example, particular power management (e.g., sleep mode) operational parameters may be optimized at the PHY+ layers (e.g., sleep time intervals, wake trigger criteria, etc.). Various other signal processing circuitry (e.g., anti-jitter circuitry, echo cancellation circuitry, smart queuing circuitry, packetizing circuitry, user interface circuitry, PHY+ communication protocol circuitry, etc.) may also be optimized in addition to PHY layer circuitry.

The following discussion will further illustrate various aspects of the present invention by way of non-limiting illustrative exemplary scenarios.

In a non-limiting exemplary scenario, the MCD 200 may comprising a first PHY layer 210 comprising first circuitry (e.g., Fixed Circuitry 212 and Optimizable Circuitry 214) operable to provide any of at least a first plurality of communication services through one or more types of communication network, and a second PHY layer 220 comprising second circuitry (e.g., Fixed Circuitry 222 and/or Optimizable Circuitry 224) operable, independent of the first PHY layer 210, to provide at least one communication service through one or more types of communication network. Operation of the first circuitry (e.g., Optimizable Circuitry 214) may, for example, be optimizable in a first manner for providing a first communication service of the first plurality of communication services and optimizable in a second manner, different from the first manner, for providing a second communication service of the first plurality of communication services.

In another non-limiting exemplary scenario, the second circuitry (e.g., Fixed Circuitry 222 and/or Optimizable Circuitry 224) is operable, independent of the first PHY layer 210, to provide any of at least a second plurality of communication services through one or more types of communication network. Operation of the second circuitry (e.g., the Optimizable Circuitry 224) may be optimizable in a third manner for providing a third communication service of the second plurality of communication services and optimizable in a fourth manner, different from the third manner, for providing a fourth communication service of the second plurality of communication services. Note that the second plurality of communication services may comprise some or all of the first plurality of communication services of the first non-limiting exemplary scenario discussed above.

In an additional non-limiting exemplary scenario, operation of the first circuitry (e.g., Optimizable Circuitry 214) may be optimizable in the first manner for providing the first communication service through a first type of communication network, and operation of the first circuitry may be optimizable in the second manner for providing the second communication service through the first type of communication network. In such an exemplary scenario, a same type of communication network (e.g., the exact same communication network or another communication network of the same type) may be utilized to provide the first communication service and the second communication service (e.g., of a different type than the first communication service).

In a further non-limiting exemplary scenario, operation of the first circuitry (e.g., Optimizable Circuitry 214) may be optimizable in the first manner for providing the first communication service through a first type of communication network, and operation of the first circuitry (e.g., Optimizable Circuitry 214) may be optimizable in a manner different from the first manner for providing the first communication service through a second type of communication network. In such an exemplary scenario, the type of communication network may affect optimization of the first circuitry as well as the particular communication service.

In a yet another non-limiting exemplary scenario, operation of the first circuitry (e.g., Optimizable Circuitry 214) may be optimizable in the first manner for providing the first communication service through a first type of communication network, and operation of the first circuitry may be optimizable in the second manner for providing the second communication service through a second type of communication network. In such an exemplary scenario, the first circuitry may be flexible enough to be utilized for providing different communication services through different types of communication networks.

In another non-limiting exemplary scenario, operation of the first circuitry (e.g., Optimizable Circuitry 214) may be optimizable in the first manner in real-time for providing the first communication service, and operation of the first circuitry may be optimizable in the second manner in real-time for providing the second communication service. In such an exemplary scenario, optimizable PHY circuitry may be optimized in real-time as needed (e.g., in response to a change in communication service, a change in communication network or a change in any of a variety of communication conditions).

In an additional non-limiting exemplary scenario, operation of the first circuitry (e.g., Optimizable Circuitry 214) may be optimizable in real-time during a first time period for providing the first communication service through a first communication network, and operation of the first circuitry may be optimizable in real-time during a second time period for providing the first communication service through a communication network different from the first communication network. In such an exemplary scenario, PHY layer circuit optimization may, for example, change in response to a change in communication network.

In a further non-limiting exemplary scenario, operation of the first circuitry (e.g., Optimizable Circuitry 214) may be optimizable in real-time during a first time period for providing the first communication service through the first communication network, and operation of the first circuitry may be optimizable in real-time during a second time period for continuing to provide the first communication service (e.g., an on-going communication service) through a communication network different from the first communication network. In such an exemplary scenario, PHY layer circuit optimization may change, for example, in response to a change in communication network during the performance of a single communication service. For example, a user of an MCD may move from a coverage area associated with a first communication network to a coverage area associated with a second communication network while continuing to utilize the MCD for a particular communication service.

In a still further non-limiting exemplary scenario, operation of the first circuitry (e.g., Optimizable Circuitry 214) may be optimizable in real-time during a first time period for providing the first communication service through the first communication network, and operation of the second circuitry may be optimizable in real-time during a second time period for providing the third communication service through the first communication network. For example, different independent optimizable PHY layers may be utilized to provide different communication services through a same communication network.

In yet another non-limiting exemplary scenario, operation of the first circuitry (e.g., Optimizable Circuitry 214) may be optimizable in real-time for providing the first communication service through a first communication network in response to execution of an application corresponding to the first communication service. For example, as discussed previously, application instructions that may be executed to provide a communication service may be utilized to initiate or perform optimization of various PHY layer or PHY+ layer circuitry.

In an additional non-limiting exemplary scenario, an MCD (e.g., MCD 200) may comprise a first application corresponding to the first communication service, the first application comprising application program interface ("API") commands for optimizing first PHY layer circuitry in real-time. For example, as discussed previously, a communication service application may link to and/or be compiled with instructions that, when executed, effect particular PHY layer circuit optimizations.

In another non-limiting exemplary scenario, the first circuitry (e.g., Optimizable Circuitry 214) may comprise decoder (or encoder) circuitry that is optimizable in real-time for providing the first communication service. As mentioned previously, such decoder (or encoder) circuitry may, for example, comprise selectable and/or programmable decoder (or encoder) circuitry.

In still another non-limiting exemplary scenario, the first circuitry (e.g., Optimizable Circuitry 214) may comprise a multiple-input-multiple-output (MIMO) engine that is optimizable in real-time for providing a communication service through one or more communication networks. Similarly, for example, the first circuitry may comprise an optimizable FFT engine, optimizable OFDM core, etc.

In a further non-limiting exemplary scenario, the first circuitry (e.g., Optimizable Circuitry 214) may comprise amplifier circuitry that is optimizable in real-time for providing the first communication service.

In a still further non-limiting exemplary scenario, the first circuitry (e.g., Optimizable Circuitry 214) may comprise buffer circuitry that is optimizable in real-time for providing the first communication service. Also such buffer circuitry may be optimizable in real-time (or non-real-time) for providing the first communication service through a particular communication network. As discussed previously, various PHY layer circuitry optimizations may depend on various communication network characteristics as well as various communication service characteristics.

In yet another non-limiting exemplary scenario, the MCD 200 may comprise a power control module communicatively coupled to the first PHY layer 210, where the power control module is optimizable in real-time in accordance with a plurality of different communication services. As mentioned previously, particular communication services may be more or less compatible with particular power managing (e.g., power-saving) techniques.

In a further non-limiting exemplary scenario, the MCD 200 may comprise (e.g., in the PHY+ layers 230) a CODEC module communicatively coupled to the first PHY layer 210, where the CODEC module is optimizable in real-time in accordance with a plurality of different communication services. As mentioned previously, particular communication services may correspond to particular CODEC operation. Such a CODEC module may, for example, comprise selectable CODECs, or portions thereof, or a programmable CODEC. For example and without limitation, a first voice communication service and a second voice communication service may utilize different CODECs.

In an additional non-limiting exemplary scenario, the MCD 200 may comprise (e.g., in the PHY+ layers 230) an anti-jitter module communicatively coupled to the first PHY layer 210, where the anti-jitter module is optimizable in real-time in accordance with a plurality of different communication services. For example and without limitation, a first video communication service (e.g., a movie providing service) may have relatively strict anti-jitter requirements, while a second video communication service (e.g., a person-to-person relatively slow-scan videophone service) may have relatively loose anti-jitter requirements.

As mentioned previously, there are a variety of communication services that may be provided through a variety of communication networks. In yet another non-limiting exemplary scenario, the first communication service corresponds to a voice-over-Internet-Protocol (VoIP) service, and the second communication service corresponds to a non-VoIP voice service. For example and without limitation, a non-VoIP voice service may correspond to a cellular telephone communication service or a direct unit-to-unit voice communication service or a POTS telephone service.

In still another non-limiting exemplary scenario, the first communication service corresponds to a first VoIP service, and the second communication service corresponds to a second VoIP service different from the first VoIP service. For example, all VoIP communication services are not the same. A first VoIP service may correspond to a particular PHY layer optimization, and a second VoIP service may correspond to a different PHY layer optimization.

As mentioned previously, the first and second (or other) PHY layers may be independent and may be utilized simultaneously. In a non-limiting exemplary scenario, the MCD 200 may provide a first VoIP communication service through a first communication network (e.g., an 802.11 hotspot coupled to the Internet) and a second non-VoIP voice communication service through a second communication network (e.g., the cellular network). The MCD 200 may further provide such first VoIP and second non-VoIP voice communication services simultaneously (e.g., in a three-way or teleconferencing scenario). In such a scenario, each corresponding PHY layer may comprise circuitry optimized for each respective VoIP and non-VoIP communication service.

In another non-limiting exemplary scenario, the first communication service may correspond to an audio service, and a third communication service (e.g., provided through the second PHY layer) may correspond to a video service.

As discussed previously, various PHY layer circuitry may be optimized to communicate with particular communication networks as well as to provide particular communication services. For example, in the exemplary MCD 200, the first circuitry (e.g., Optimizable Circuitry 214) may be optimizable to provide the first communication service through a computer network, and the second circuitry (e.g., the Optimizable Circuitry 224) may be optimizable to provide at least one communication service through a cellular communication network.

In a further non-limiting exemplary scenario, the first PHY layer 210 may comprise first circuitry (e.g., Optimizable Circuitry 214) optimized in a first manner to provide a first communication service through a first communication network, and the second PHY layer 220, operable independent of the first PHY layer 210, may comprise second circuitry (e.g., Optimizable Circuitry 224) optimized in a second manner, different from the first manner, to provide a second communication service through the first communication network. For example, the first PHY layer 210 and the second PHY layer 220 may be optimized to provide respective communication services through the first communication network serially or in parallel (concurrently or simultaneously).

In a still further non-limiting exemplary scenario, the first PHY layer 210 may comprise first circuitry (e.g., Optimizable Circuitry 214) optimized in a first manner to provide a first communication service through a first communication network, and the second PHY layer 220 may comprise second circuitry (e.g. Optimizable Circuitry 224) optimized in a second manner, different from the first manner, to provide a second communication service through a second communication network.

The previously presented non-limiting exemplary scenarios illustrate various aspects of the present invention. Such non-limiting exemplary scenarios do not represent an exclusive list of embodiments and/or aspects of the present invention. Accordingly, the scope of various aspects of the present invention should not be limited by characteristics of the previous exemplary illustrations unless explicitly claimed.

Figure 5:
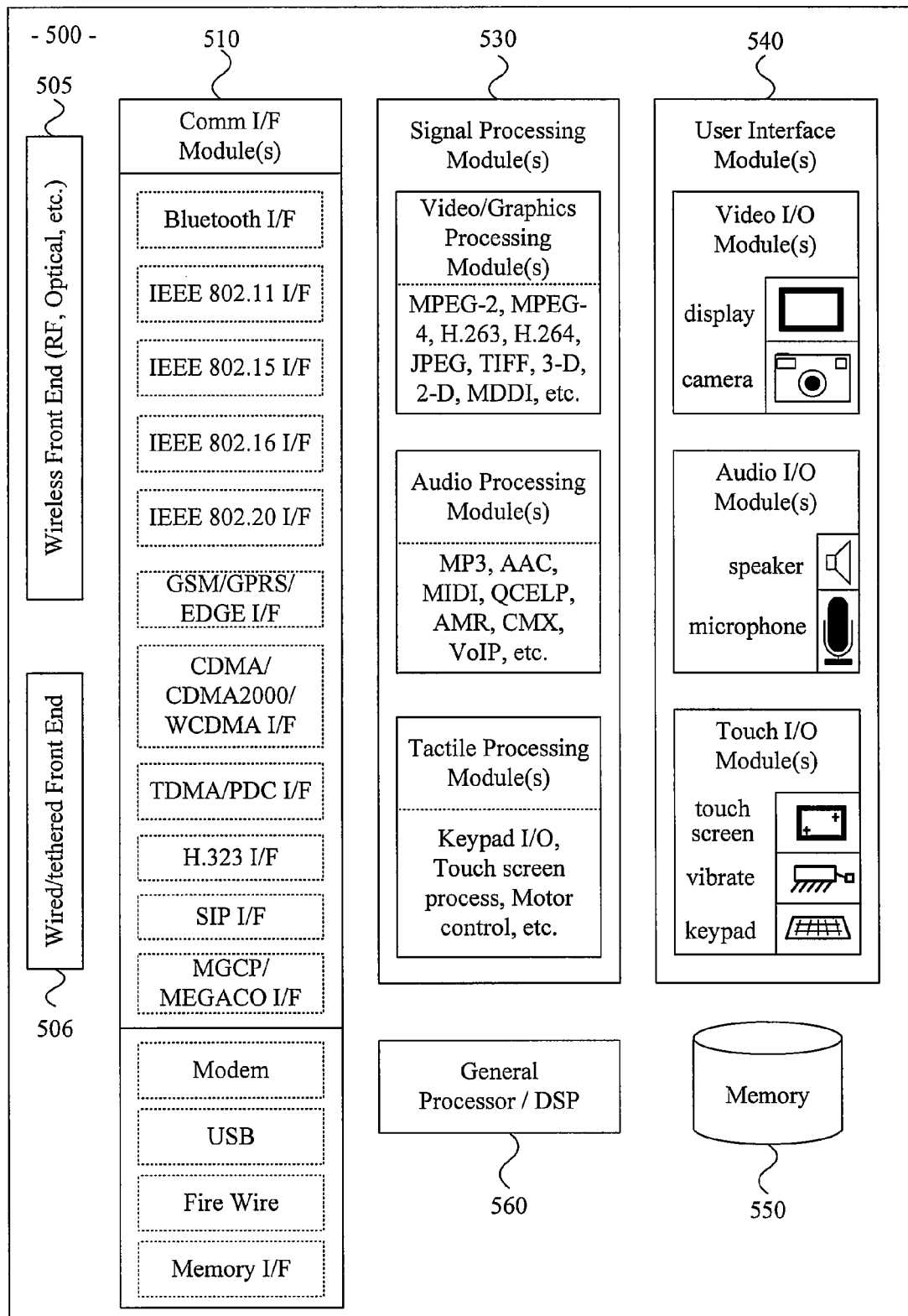
FIG. 5 is a block diagram illustrating an exemplary mobile communication device, in accordance with various aspects of the present invention.

FIG. 5 is a block diagram illustrating a non-limiting exemplary mobile communication device 500, in accordance with various aspects of the present invention. The exemplary mobile communication device ("MCD") 500 may, for example and without limitation, share any or all characteristics with the exemplary MCDs 100, 200 illustrated in FIGS. 1-2 and discussed previously, and with exemplary PHY layer receiving circuitry 300 or PHY layer transmitting circuitry 400 illustrated in FIGS. 3-4 and discussed previously.

For example, the exemplary MCD 500 may comprise any of a variety of communication interface modules 510, a wireless front end 505 and a wired/tethered front end 506, which may, for example and without limitation, share various characteristics with the exemplary first PHY layer 210, second PHY layer 220 and PHY+ layers 230 of the exemplary MCD 200 illustrated in FIG. 2 and discussed previously. Also for example, the MCD 500 may comprise a processor 560 and memory 550, which may, for example and without limitation, execute and store executable instructions to implement various functionality discussed previously.

The exemplary MCD 500 is illustrated with a non-limiting exemplary set of communication interface modules 510, including: a Bluetooth interface module, IEEE 802.11 interface module, IEEE 802.15 interface module, IEEE 802.16 interface module, IEEE 802.20 interface module, GSM/GPRS/EDGE interface module, CDMA/CDMA2000/WCDMA interface module, TDMA/PDC interface module, H.323 interface module, SIP interface module, MGCP/MEGACO interface module, modem module, USB module, fire wire module and memory interface module (e.g., for interfacing with off-board or removable memory).

Further for example, the exemplary MCD 500 may comprise any of a variety of signal processing modules 530, which may, for example and without limitation, share various characteristics with the PHY+ layers 230 and/or the application layer 240 of the exemplary MCD 200 illustrated in FIG. 2 and discussed previously.

The exemplary mobile communication device 500 is illustrated with a non-limiting exemplary set of signal processing modules 530, which may be selectively utilized in accordance with current signal processing needs. The signal processing modules 530 may, for example, comprise various video, audio (e.g., VoIP), textual, graphical and tactile signal-processing modules. The signal processing modules 530 may generally, for example, process information conveyed between the front ends 505 and 506 and communication interface module(s) 510 of the MCD 500 and the user interface module(s) 540 of the mobile communication device 500.

Still further for example, the exemplary MCD 500 may comprise any of a variety of user interface modules 540, at least some of which may be optimizable in accordance with various communication services. The user interface module(s) 540 may, for example and without limitation, comprise any of a variety of video/graphics processing modules, audio processing modules, and tactile signal processing modules. The mobile communication device 500 may also comprise compatible user interface devices corresponding to the various user interface module(s) 540 (e.g., a video display, camera, speaker, microphone, touch screen, keypad, vibrator, etc.). Such user interface modules 540 and/or user interface devices may generally correspond to various communication services that may be provided to a user by the MCD 500.

The exemplary MCD 500 illustrated in FIG. 5 was presented to illustrate a portion of generally broader aspects of the present invention. Accordingly, the scope of various aspects of the present invention should not be limited by characteristics of the exemplary illustration.

The exemplary mobile communication devices 100, 200 and 500 of FIGS. 1, 2 and 5, which may include at least portions of the exemplary receiver 300 and transmitter 400 circuitry of FIGS. 3 and 4 and discussed previously were presented to provide non-limiting exemplary illustrations of various aspects of the present invention. Accordingly, the scope of various aspects of the present invention should not be limited by characteristics of the exemplary mobile communication devices and/or receiver or transmitter circuitry.

Various aspects of the present invention have been described above with the aid of functional (or communication layer) building blocks illustrating the performance of certain significant functions (or communication layers). The boundaries of these blocks and relationships between various blocks have been defined and/or presented for convenience of description. Alternate boundaries or relationships could be defined so long as the certain significant functions are appropriately performed. Such alternate boundaries or relationships are thus within the scope and spirit of the claimed invention. Additionally, the functional (or communication layer) building blocks, and other illustrative blocks, modules and components herein, can be implemented as illustrated or by discrete components, application specific integrated circuits, processors executing appropriate software and the like or any combination thereof. For example and without limitation, any of the previously discussed optimizable PHY layer circuitry may be implemented in a single integrated circuit.

Figure 6:
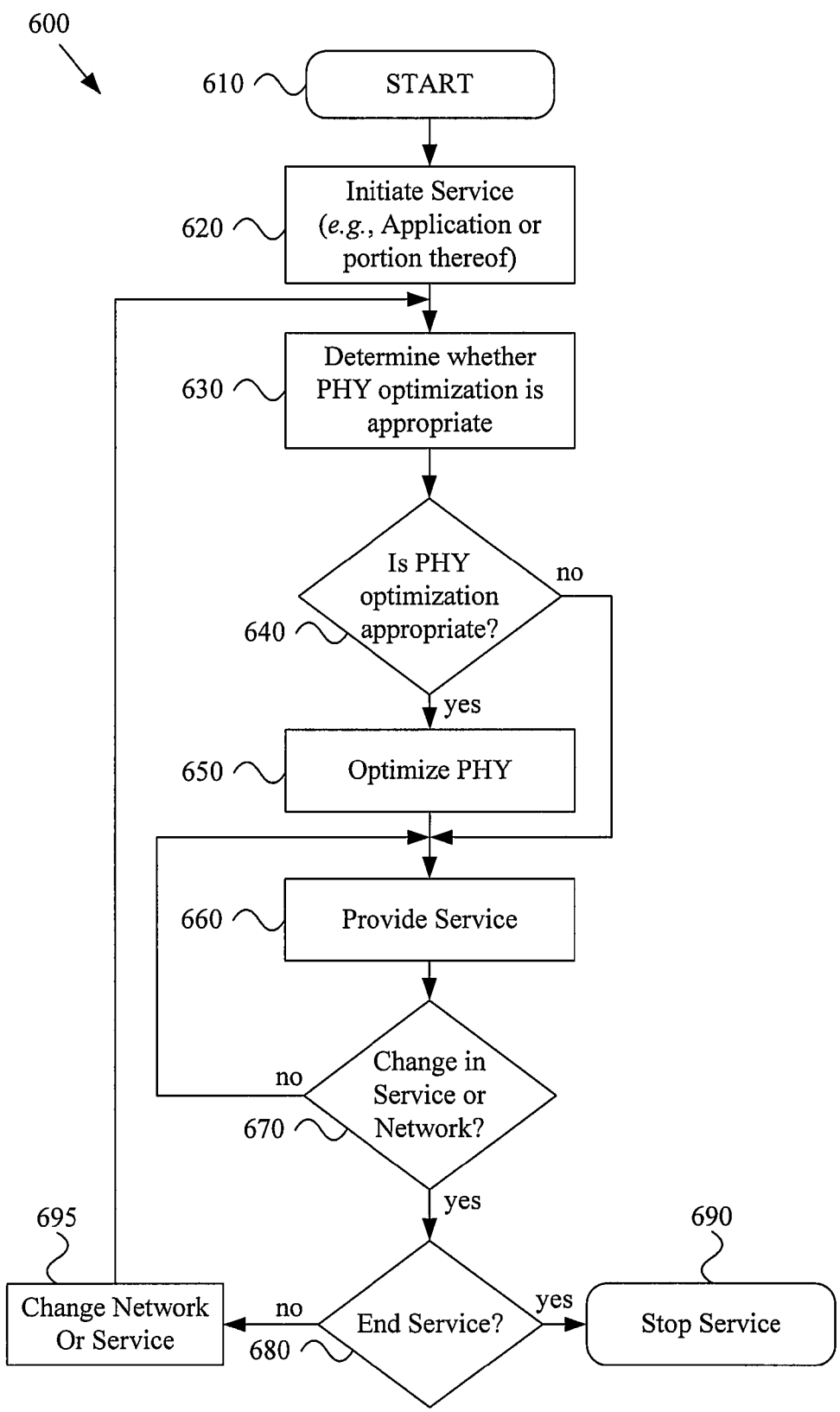
FIG. 6 is an exemplary method, in a mobile communication device, for utilizing one or more optimizable physical layers to provide one or more communication services, in accordance with various aspects of the present invention.

FIG. 6 is an exemplary method 600, in a mobile communication device ("MCD"), for utilizing one or more optimizable physical layers to provide one or more communication services, in accordance with various aspects of the present invention. The exemplary method 600 may, for example and without limitation, share any or all functional characteristics with the exemplary mobile communication devices 100, 200 and 500 and with various components of the exemplary PHY layer receiving circuitry 300 and transmitting circuitry 400 illustrated in FIGS. 1-5 and discussed previously. The exemplary method 600 may, for example, be implemented in any of the mobile communication devices 100, 200 and 500 discussed previously.

A mobile communication device may, for example, implement the exemplary method 600. Such a mobile communication device may comprise characteristics of any of a variety of types of mobile communication devices, non-limiting examples of which were presented previously. The mobile communication device may, for example, be capable of providing various communication services through various communication networks.

The exemplary method 600 may begin executing at step 610. The exemplary method 600 may begin executing in response to any of a variety of causes or conditions. For example, the exemplary method 600 may begin executing in response to a power-up or reset condition of a mobile communication device implementing the method 600. Also for example, the exemplary method 600 may begin executing in response to a user input indicating the user desires to initiate a communication service and/or explore various communication options (e.g., by perusing and selecting from menu of communication service options).

The exemplary method 600 may, at step 620, comprise initiating a communication service. Such initiation may occur in response to any of a variety of causes or conditions. For example and without limitation, initiation may occur in response to a user input or other input to the MCD. Also for example, such initiation may occur upon execution of an application corresponding to a particular communication service. Additionally for example, such initiation may occur in response to execution of a particular portion of an application corresponding to a particular communication service.

The exemplary method 600 may, at step 630, comprise determining whether PHY layer optimization is appropriate. For example, step 630 may comprise determining whether there is a particular PHY layer optimization that corresponds to a particular communication service (e.g., the communication service initiated at step 620). For example, one or more particular communication services might utilize a general PHY layer configuration, and one or more particular other communication services might utilize an optimized PHY layer configuration. Determining whether PHY layer optimization is appropriate in a particular communication service scenario may comprise considering any of a variety of factors, including but not limited to, communication service type, communication network type, the optimizability of various PHY layer circuits in the MCD, etc.

The determination of whether PHY layer optimization is currently appropriate may also comprise considering the present optimization state of various optimizable PHY layer circuits. For example, if the PHY layer of interest is already in an optimized state desired for a particular communication service, then no further optimization activity is necessary.

If it is determined (e.g., at step 630) that PHY layer optimization is appropriate for a communication service, then execution flow control block 640 directs execution of the method 600 to step 650. If, however, it is determined (e.g., at step 630) that PHY layer optimization is not appropriate for a communication service, then execution flow control block 640 directs execution of the method 600 to skip step 650.

The exemplary method 600, at step 650, may comprise optimizing operation of the PHY layer (e.g., optimizing optimizable circuitry in the PHY layer) for providing a particular communication service (e.g., the communication service initiated at step 620). Step 650 may comprise performing any of a variety of PHY layer optimizations. For example and without limitation, the previous discussions of FIGS. 1-5 provide non-exclusive examples of a variety of PHY layer optimizations.

The exemplary method 600, at step 660, may comprise providing a communication service. For example, step 660 may comprise providing the communication service initiated at step 620, for which PHY layer circuitry was optimized at step 650. As discussed previously in the discussion of FIGS. 1-5, a communication service may be provided through any of a variety of communication networks.

Flow control block 670 may comprise directing execution flow of the exemplary method 600 based on whether a change in communication service and/or network has occurred. For example, a user or the MCD may initiate a different communication service and/or may utilize a different communication network. If there has been no change in communication service and/or network, flow control block 670 may loop back up to step 660 for continued provision of the present communication service. If there has been a change in communication service and/or network, flow control block 670 may direct execution flow to flow control block 680.

Flow control block 680 may comprise direction execution flow of the exemplary method 600 based on whether the change in communication service and/or network corresponds to ending the communication service. If so, then flow control block 680 directs execution of the method 600 to step 690 for stopping the communication service.

If the communication service is not ending (e.g., there is either a change to a different communication service and/or a change in communication network, but not an end of service), then flow control block 680 directs execution flow of the method 600 to step 695. The exemplary method 600, at step 695, may comprise performing various communication activities associated with a change in communication service and/or network. For example and without limitation, step 695 may comprise establishing communication pathways corresponding to the desired communication service. Such communication pathway establishment may, for example, comprise the establishment of appropriate communication links with a communication network and various set-up activities associated with communication stack management at the MCD.

Execution flow of the exemplary method flows from step 695 back to step 630 for a new determination of whether PHY optimization activity is appropriate in view of the change in communication service and/or network, and continued method execution from step 630.

Note that various activities illustrated in the exemplary method 600 need not be performed in a particular order. For example and without limitation, activities associated with initiating a communication service and/or changing communication service or network may be performed concurrently with various PHY layer optimization activities.

As discussed previously, aspects of the exemplary method 600 may be implemented in a mobile communication device, such as, for example, those mobile communication devices 100, 200 and 500 discussed previously. The following discussion will further illustrate various aspects of the present invention by way of non-limiting illustrative exemplary scenarios.

In a non-limiting exemplary scenario, various aspects of the present invention may be implemented in a mobile communication device having a first PHY layer comprising first circuitry operable to provide any of at least a first plurality of communication services through one or more types of communication network, and a second PHY layer comprising second circuitry operable, independent of the first PHY layer, to provide at least one communication service through one or more types of communication network. The exemplary method 600 may (e.g., at step 650) comprise optimizing operation of the first circuitry (e.g., optimizable PHY layer circuitry) in a first manner for providing a first communication service of the first plurality of communication services, and optimizing operation of the first circuitry in a second manner, different from the first manner, for providing a second communication service of the first plurality of communication services.

In another non-limiting exemplary scenario (e.g., where the second circuitry is operable to provide any of at least a second plurality of communication services through one or more types of communication network), the exemplary method 600 may (e.g., at step 650) comprising optimizing operation of the second circuitry in a third manner for providing a third communication service of the second plurality of communication services, and optimizing operation of the second circuitry in a fourth manner, different from the third manner, for providing a fourth communication service of the second plurality of communication services.

In yet another non-limiting exemplary scenario, the exemplary method 600 may (e.g., at step 650) comprise optimizing operation of the first circuitry in a first manner by, at least in part, optimizing operation of the first circuitry for providing the first communication service through a first type of communication network, and optimizing operation of the first circuitry in a second manner by, at least in part, optimizing operation of the first circuitry for providing the second communication service through the first type of communication network.

In still another non-limiting exemplary scenario, the exemplary method 600 may (e.g., at step 650) comprise optimizing operation of the first circuitry in the first manner for providing the first communication service through a first type of communication network, and optimizing operation of the first circuitry in a manner different from the first manner for providing the first communication service through a second type of communication network.

In another non-limiting exemplary scenario, the exemplary method 600 may (e.g., at step 650) comprise optimizing operation of the first circuitry in a first manner by, at least in part, optimizing operation of the first circuitry for providing the first communication service through a first type of communication network, and optimizing operation of the first circuitry in a second manner by, at least in part, optimizing operation of the first circuitry for providing the second communication service through a second type of communication network.

In yet another non-limiting exemplary scenario, the exemplary method 600 may (e.g., at step 650) comprise optimizing operation of the first circuitry in a first manner by, at least in part, optimizing operation of the first circuitry in real-time for providing the first communication service, and optimizing operation of the first circuitry in a second manner, different from the first manner, by, at least in part, optimizing operation of the first circuitry in real-time for providing the second communication service.

The exemplary method 600 illustrated in FIG. 6 was presented to provide non-limiting exemplary illustrations of various functional aspects of the present invention. Accordingly, the scope of various aspects of the present invention should not be limited by specific characteristics of the exemplary method 600 unless explicitly claimed.

Various aspects of the present invention have been described above with the aid of functional (or protocol) blocks and method steps illustrating the performance of specified circuits, protocol layers, functions and relationships thereof. The boundaries and sequence of these blocks and method steps have been arbitrarily defined herein for convenience of description. Alternate boundaries and sequences can be defined so long as the specified functions and relationships are appropriately performed. Any such alternate boundaries or sequences are thus within the scope and spirit of various aspects of the present invention.

In summary, various aspects of the present invention provide a system and method in a mobile communication device for providing and/or utilizing multiple independent optimized physical layers to provide communication services. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A mobile communication device, comprising:
a first PHY layer comprising first circuitry configured to provide any of at least a first plurality of communication services through one or more types of communication networks using at least one of a plurality of performance characteristics;
a second PHY layer comprising second circuitry configured, independent of the first PHY layer, to provide at least one communication service through one or more types of communication networks;
wherein operation of the first circuitry is optimizable in a first manner for providing a first communication service of the first plurality of communication services through a first type of communication network using at least a first set of the plurality of performance characteristics, and optimizable in a second manner, different from the first manner, for providing a second communication service of the first plurality of communication services through the first type of communication network using at least a second set of the plurality of performance characteristics;
wherein operation of the second circuitry is optimizable in a third manner for providing a third communication service of a second plurality of communication services through a second type of communication network, and optimizable in a fourth manner, different from the third manner, for providing a fourth communication service of the second plurality of communication services through the second type of communication network; and
a CODEC module, comprising one or more of selectable CODECs or programmable CODECs, communicatively coupled to the first or the second PHY layer, wherein circuitry of the CODEC module is optimizable in accordance with the first or the second plurality of communication services that correspond to respective operations of the CODEC module.

2. The mobile communication device of claim 1, wherein:
operation of the first circuitry is optimizable in the first manner for providing the first communication service through the second type of communication network; and
operation of the first circuitry is optimizable in the second manner for providing the second communication service through the second type of communication network.

3. The mobile communication device of claim 1, wherein:
operation of the first circuitry is optimizable in the first manner in real-time for providing the first communication service; and
operation of the first circuitry is optimizable in the second manner in real-time for providing the second communication service.

4. The mobile communication device of claim 1, wherein:
operation of the first circuitry is optimizable in real-time during a first time period for providing the first communication service through the first communication network; and
operation of the first circuitry is optimizable in real-time during a second time period for providing the first communication service through a communication network different from the first communication network.

5. The mobile communication device of claim 1, wherein:
operation of the first circuitry is optimizable in real-time during a first time period for providing the first communication service through the first communication network; and
operation of the first circuitry is optimizable in real-time during a second time period for providing the second communication service through a communication network different from the first communication network.

6. The mobile communication device of claim 1, wherein:
operation of the first circuitry is optimizable in real-time during a first time period for providing the first communication service through the first communication network; and
operation of the second circuitry is optimizable in real-time during a second time period for providing the third communication service through the first communication network.

7. The mobile communication device of claim 1, wherein the first circuitry is optimizable in real-time for providing the first communication service through the first communication network in response to execution of a software application corresponding to the first communication service.

8. The mobile communication device of claim 1, further comprising a first application corresponding to the first communication service, the first application comprising application program interface (API) commands for optimizing the first circuitry in real-time.

9. The mobile communication device of claim 1, wherein the first circuitry comprises decoder circuitry that is optimizable in real-time for providing the first communication service.

10. The mobile communication device of claim 1, wherein the first circuitry comprises a multiple-input-multiple-output (MIMO) engine that is optimizable in real-time for providing a communication service through one or more communication networks or an orthogonal frequency division multiplexing (OFDM) engine that is optimizable in real-time for providing a communication service through one or more communication networks.

11. The mobile communication device of claim 1, wherein the first circuitry comprises amplifier circuitry that is optimizable in real-time for providing the first communication service.

12. The mobile communication device of claim 1, wherein the first circuitry comprises buffer circuitry that is optimizable in real-time for providing a selected communication service.

13. The mobile communication device of claim 12, wherein the buffer circuitry is optimizable in real-time for providing the first communication service through a selected communication network.

14. The mobile communication device of claim 1, further comprising a power control module communicatively coupled to the first PHY layer, where the power control module is optimizable in real-time in accordance with a plurality of different communication services.

15. The mobile communication device of claim 1, further comprising an anti-jitter module communicatively coupled to the first PHY layer, where the anti-jitter module is optimizable in real-time in accordance with a plurality of different communication services.

16. The mobile communication device of claim 1, wherein: the first communication service corresponds to a Voice-over-Internet Protocol (VoIP) service; and
the second communication service corresponds to a non-VoIP voice service.

17. The mobile communication device of claim 1, wherein: the first communication service corresponds to a first VoIP service; and
the second communication service corresponds to a second VoIP service different from the first VoIP service.

18. The mobile communication device of claim 1, wherein: the first communication service corresponds to a VoIP service; and the third communication service comprises a non-VoIP voice service.

19. The mobile communication device of claim 1, wherein: the first communication service corresponds to an audio service; and the third communication service corresponds to a video service.

20. The mobile communication device of claim 1, wherein: the first circuitry is optimizable to provide the first communication service through a computer network; and
the second circuitry is optimizable to provide at least one communication service through a cellular communication network.

21. In a mobile communication device having a first PHY layer comprising first circuitry configured to provide any of at least a first plurality of communication services through one or more types of communication networks, and a second PHY layer comprising second circuitry configured, independent of the first PHY layer, to provide a second plurality communication services through one or more types of communication networks, a method comprising:
optimizing operation of the first circuitry in a first manner for providing a first communication service of the first plurality of communication services through a first type of communication network using at least a first set of a plurality of performance characteristics;
optimizing operation of the first circuitry in a second manner, different from the first manner, for providing a second communication service of the first plurality of communication services through the first type of communication network using at least a second set of the plurality of performance characteristics;
optimizing operation of the second circuitry in a third manner for providing a third communication service of the second plurality of communication services through a second type of communication network;
optimizing operation of the second circuitry in a fourth manner, different from the third manner, for providing a fourth communication service of the second plurality of communication services through the second type of communication network; and
optimizing a CODEC module of the mobile communication device by selecting or programming, respectively, one or more of selectable CODECs or programmable CODECs, wherein circuitry of the CODEC module is optimizable in accordance with the first or the second plurality of communication services that correspond to respective operations of the CODEC module.

22. The method of claim 21, wherein:
optimizing operation of the first circuitry in the first manner comprises optimizing operation of the first circuitry for providing the first communication service through the second type of communication network; and
optimizing operation of the first circuitry in the second manner comprises optimizing operation of the first circuitry for providing the second communication service through the second type of communication network.

23. The method of claim 21, wherein:
optimizing operation of the first circuitry in the first manner comprises optimizing operation of the first circuitry in real-time for providing the first communication service; and
optimizing operation of the first circuitry in the second manner, different from the first manner, comprises optimizing operation of the first circuitry in real-time for providing the second communication service.

24. A method caused by a multi-media provider that communicates data from the multi-media provider through a network to a mobile communication device, the method comprising:

optimizing operation of a first circuitry of a first PHY layer in a first manner for providing a first communication service of a first plurality of communication services through a first type of communication network using at least a first set of a plurality of performance characteristics;

optimizing operation of the first circuitry in a second manner, different from the first manner, for providing a second communication service of the first plurality of communication services through the first type of communication network using at least a second set of the plurality of performance characteristics;

optimizing operation of a second circuitry of a second PHY layer, independent of the first PHY layer, in a third manner for providing a third communication service of a second plurality of communication services through a second type of communication network;

optimizing operation of the second circuitry in a fourth manner, different from the third manner, for providing a fourth communication service of the second plurality of communication services through the second type of communication network; and optimizing a CODEC module by selecting or programming, respectively, one or more of selectable CODECs or programmable CODECs, where the CODEC module is communicatively coupled to the first PHY layer or the second PHY layer, and wherein circuitry of the CODEC module is optimizable in accordance with the first or the second plurality of communication services that correspond to respective operations of the CODEC module.

25. The method of claim 1, wherein the first or the second circuitry or a processor of the mobile communication device executes executable instructions for controlling the optimization of the CODEC module.

26. The method of claim 21, wherein the first or the second circuitry or a processor of the mobile communication device executes executable instructions for controlling the optimization of the CODEC module.

27. The method of claim 24, wherein the first or the second circuitry or a processor of the mobile communication device executes executable instructions for controlling the optimization of the CODEC module.

* * * * *